United States Patent
Konrad

(10) Patent No.: US 10,900,588 B2
(45) Date of Patent: Jan. 26, 2021

(54) ACTUATOR AND METHOD FOR SETTING AN ACTUATOR

(71) Applicant: Siemens Schweiz AG, Zürich (CH)

(72) Inventor: Hilmar Konrad, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 76 days.

(21) Appl. No.: 16/410,253

(22) Filed: May 13, 2019

(65) Prior Publication Data
US 2019/0346059 A1 Nov. 14, 2019

(30) Foreign Application Priority Data

May 14, 2018 (EP) .................................... 18172170

(51) Int. Cl.
*F16K 31/143* (2006.01)
*F15B 15/14* (2006.01)
*F16K 31/122* (2006.01)

(52) U.S. Cl.
CPC ........ *F16K 31/143* (2013.01); *F15B 15/1428* (2013.01); *F15B 15/1442* (2013.01); *F16K 31/1221* (2013.01); *F15B 2215/30* (2013.01)

(58) Field of Classification Search
CPC . F16K 31/143; F16K 31/1221; F15B 15/1428
See application file for complete search history.

(56) References Cited

U.S. PATENT DOCUMENTS

| | | | | |
|---|---|---|---|---|
| 2,281,383 A | * | 4/1942 | Raphael | E05F 11/445 74/89.19 |
| 2,502,356 A | * | 3/1950 | Wagner | F16H 3/14 74/377 |
| 3,042,357 A | * | 7/1962 | Engholdt | F16K 31/043 251/78 |
| 4,669,578 A | * | 6/1987 | Fukamachi | F16K 31/043 185/40 R |
| 5,556,073 A | * | 9/1996 | Wawro | A61B 5/0235 251/129.11 |

(Continued)

FOREIGN PATENT DOCUMENTS

| | | | |
|---|---|---|---|
| CN | 1835811 A | 9/2006 | B05C 11/02 |
| CN | 102095018 A | 6/2011 | F16K 31/44 |

(Continued)

*Primary Examiner* — David M Fenstermacher
(74) *Attorney, Agent, or Firm* — Slayden Grubert Beard PLLC

(57) ABSTRACT

Various embodiments include an actuator comprising: a drive element; a transmission section; an actuating element mechanically actively connected to the drive element through the transmission section; a reset spring exerting a closing force on the actuating element; and a coupling device providing a mechanically active connection between the reset spring and the transmission section. The coupling device is configured to be brought into a first coupling state and a second coupling state. With the coupling device in the first coupling state, the reset spring exerts the closing force on the actuating element in a first closing direction. With the coupling device in the second coupling state, the reset spring exerts the closing force on the actuating element in a second closing direction. The first closing direction and the second closing direction are different.

14 Claims, 4 Drawing Sheets

(56) References Cited

U.S. PATENT DOCUMENTS

| | | | |
|---|---|---|---|
| 5,657,664 A * | 8/1997 | Birchmeier | F16H 3/001 185/40 R |
| 7,066,301 B2 | 6/2006 | Oh et al. | 185/40 R |
| 7,395,733 B2 * | 7/2008 | Liu | B60N 2/6671 74/421 R |
| 8,157,242 B2 | 4/2012 | Parsons et al. | 251/93 |
| 8,424,406 B2 * | 4/2013 | Wintsch | F16K 31/535 74/421 A |
| 8,757,023 B2 * | 6/2014 | Ternovetsky | F16H 3/001 74/377 |
| 9,530,580 B2 * | 12/2016 | Bottcher | H01H 3/52 |
| 9,945,447 B2 | 4/2018 | Telep et al. | |
| 10,154,936 B2 * | 12/2018 | Choi | A61H 3/00 |
| 2005/0109142 A1 * | 5/2005 | Schunke | H02K 7/116 74/421 A |
| 2007/0170385 A1 * | 7/2007 | Furrer | F24F 13/1426 251/129.12 |
| 2009/0301238 A1 | 12/2009 | Wintsch et al. | 74/89.17 |
| 2019/0176300 A1 | 6/2019 | Lin | |

FOREIGN PATENT DOCUMENTS

| | | | | |
|---|---|---|---|---|
| CN | 105822728 A | 8/2016 | | F16H 1/32 |
| CN | 207064772 U | 3/2018 | | F16K 31/05 |
| DE | 10 2013 109 997 A1 | 3/2015 | | F16H 33/02 |
| EP | 0 697 546 A1 | 2/1996 | | F16H 19/00 |
| WO | 2007/051332 A2 | 5/2007 | | F16H 35/00 |

\* cited by examiner

ACTUATOR AND METHOD FOR SETTING AN ACTUATOR

CROSS-REFERENCE TO RELATED APPLICATIONS

This application claims priority to EP Application No. 18172170.5 filed May 14, 2018, the contents of which are hereby incorporated by reference in their entirety.

TECHNICAL FIELD

The present disclosure relates to actuators. Various embodiments include a drive element, a transmission section, and an actuating element, wherein the drive element has a mechanically active connection to the actuating element through the transmission section, a reset spring which provides a closing force acting on the actuating element with a mechanically active connection to the actuating element.

BACKGROUND

Actuators are frequently used in modern technology, for driving a flap or a valve for example, in particular for heating, ventilation, or cooling of a building. The respective flap or the valve is mostly moved by the actuating element of the actuator or is even at least partly formed directly by said element. The actuator is often configured to move the actuating element from a first position into a second position. Both actuating positions can usually also form end stops. Moreover, a first actuating position can be referred to as the start position or rest position, into which the actuator restores the actuating element again in the non-powered state of the drive element, in particular by means of a pre-tensioned reset spring. The second position can be referred to as the actuation position or end position. For this and other reasons the actuators must be reliable, durable, low-cost, compact and able to be produced in high volumes.

With this type of valve, the use of the reset spring results in a predetermined installation position or direction for the actuator. The closing force is mostly predetermined by the reset spring used in relation to its closing direction from the second position into the first position. Thus, through a use of the actuator differing from the predetermined installation position or direction, a closing force of the reset spring with a differing closing direction, for example from the first actuating position into the second actuating position, would automatically be produced. In this case a functionality of such an actuator according to specifications can no longer be ensured.

In the prior art, different actuators are provided for various installation positions or directions. The consequence is a corresponding increase in costs both in production and in maintaining stocks of such actuators. Moreover, expensive mechanical modifications are made to the actuator itself, in order to make a variable installation in different installation directions or positions possible, see for example EP 0 697 546 A1. An at least partial dismantling and modification of the actuator is needed here however, whereby even this solution in accordance is associated with a large outlay in time and technology.

SUMMARY

The teachings of the present disclosure may be used to at least partly overcome the previously described disadvantages of actuators. In particular, some embodiments of the teachings herein include an actuator and/or a method for setting an actuator that, in a simple and low-cost manner, make a use of the actuator in various installation positions or directions possible.

BRIEF DESCRIPTION OF THE DRAWINGS

Further advantages, features, and details of the teachings herein emerge from the description given below, in which the drawings are described in detail. In the depicted embodiments, the features mentioned in the claims and in the description can each be of importance individually or in any given combination. Elements with the same function and method of operation are provided with the same reference characters in FIGS. 1 to 4 in each case. In the figures, in schematic diagrams:

DETAILED DESCRIPTION

Figure 1:
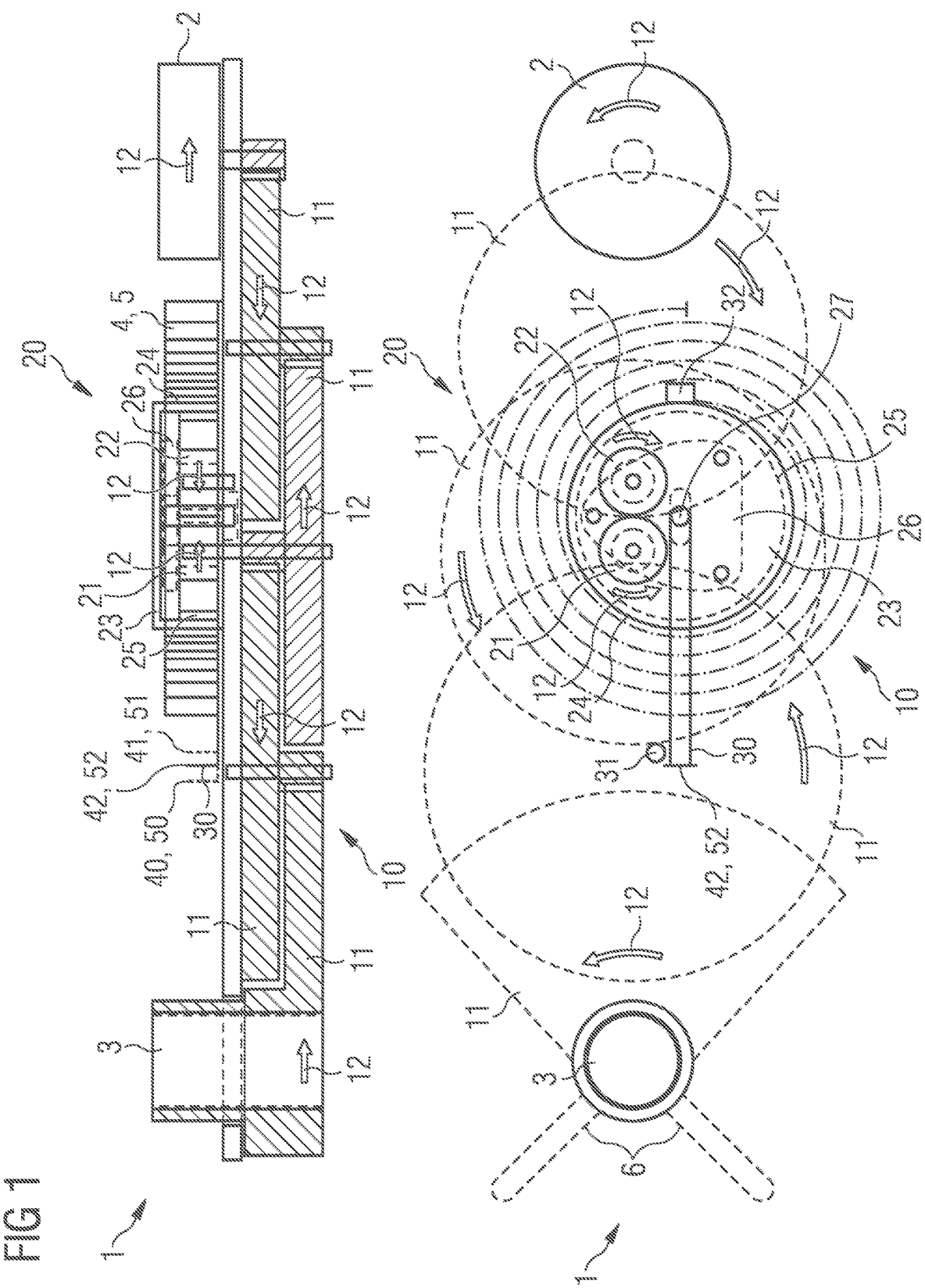
FIG. 1 shows an actuator incorporating teachings of the present disclosure with a coupling device in the neutral state.

In some embodiments, there is an actuator, having a drive element, a transmission section and an actuating element, wherein the drive element for driving the actuating element has a mechanically active connection to the actuating element through the transmission section, the actuator further having a reset spring for providing a closing force acting on the actuating element. In some embodiments, the actuator has a coupling device for providing a mechanically active connection between the reset spring and the transmission section, wherein the coupling device is able to be brought into at least a first coupling state and into a second coupling state, wherein also, with the coupling device in its first coupling state, the reset spring exerts the closing force in a first closing direction and with the coupling device in its second coupling state, the reset spring exerts the closing force in a second closing direction on the actuating element, and wherein the first closing direction and the second closing direction are different.

In some embodiments, an actuator can be used in all areas of application in which actuators are usually employed. In particular, an actuator can be used for actuating flaps and/or valves in systems for heating, ventilation, or cooling in a building. In some embodiments, an actuator has a drive element, e.g. an electric motor or also a pneumatic or hydraulic cylinder element for example, to provide the mechanical energy needed for actuating the actuating element.

In some embodiments, the element in its turn can drive a flap or a valve for example or even be formed as a part of such a flap or valve itself. In order to transmit the mechanical energy or the movement from the drive element to the actuating element, an actuator has a transmission section, via which the drive element and the actuating element have a mechanically active connection. A mechanically active connection of this type can for example be provided via a lever handle, preferably via a gear wheel transmission, as part of the transmission section. Moreover, an actuator has a reset spring, through which a closing force acting on the actuating element can be provided.

In some embodiments, in addition to the components given above, a coupling device is provided, which is employed for providing a mechanically active connection between the reset spring and the transmission section. In other words, the reset spring is not mechanically actively coupled directly to the drive element, the transmission section or the actuating element, but indirectly via the coupling device. Via this coupling device, as already described above, a mechanically active connection can be established between the reset spring and the transmission section, whereby a mechanically active connection can be established automatically between the reset spring via the transmission section and the actuating element.

In some embodiments, the coupling device can now be brought into at least a first coupling state and a second coupling state. These two coupling states are in particular different and also have different effects and results in respect of the overall actuator. In other words, the mechanically active connection, which is established between the reset spring and the transmission section, and consequently also between the reset spring and the actuating element, differs in the two coupling states. In particular the closing force of the reset spring, for a coupling device in its first coupling state acts on the actuating element in a first closing direction, for a coupling device in its second state it acts in a second closing direction.

In some embodiments, the first closing direction and the second closing direction differ. In other words, at least two different closing directions of the closing force of the reset spring acting on the actuating element can be set via the coupling device and its coupling states. In some embodiments, the two closing directions differ in such a way that a different installation of the actuator in respect of an installation position or direction can be made possible through them. In other words the two closing directions can be embodied in such a way that movements of the actuating element that are brought about by a closing force in the first closing direction differ from movements of the actuating element that are brought about by a closing force in the second closing direction in such a way that the corresponding directions of movement of the actuating element are different.

To summarise, in an actuator, a choice of the coupling state of the coupling device, a closing direction of a closing force of the reset spring, which acts via the transmission section on the actuating element, can be changed and explicitly set. In this way provision can be made for a use of an actuator in different installation positions and/or directions, in particular without requiring an at least part dismantling and modification of the actuator.

In some embodiments, the first closing direction and the second closing direction to be opposite or at least essentially opposite.

In this way it can be ensured especially easily that the movements of the actuating element, which are brought about by the closing forces of the reset spring differing in the first closing direction or in the second closing direction, are in particular being opposite or at least essentially opposite. The possibility of installing the actuator in different installation positions or directions can be ensured in this way in an even simpler manner.

In some embodiments, the coupling device comprises a first coupling gear wheel, a second coupling gear wheel, and also a coupling sleeve with inner toothing, wherein the coupling gear wheels have a mechanically active connection in such a way that they have opposing directions of rotation, and wherein further the first coupling gear wheel is mechanically actively connected to the transmission section, and wherein, for a coupling device in its first coupling state, the inner toothing of the coupling sleeve engages by meshing into the first coupling gear wheel and for a coupling device in its second coupling state the inner toothing of the coupling sleeve engages by meshing into the second coupling gear wheel.

In some embodiments, the coupling device has components that are mechanically especially simple, in order to be able to provide the at least two coupling states for the different closing directions. In particular the coupling device has two coupling gear wheels, which have a mechanically active connection to one another. In particular this mechanically active connection of the two coupling gear wheels is embodied in such a way that the two coupling gear wheels have opposite directions of rotation. This can be provided for example by the two coupling gear wheels engaging by meshing directly and immediately into one another.

In some embodiments, a coupling sleeve is provided as another important component of the coupling device, which has inner toothing. In particular the mechanically active connection of this inner sleeve with one of the two coupling gear wheels in each case now produces the different mechanically active connections in respect of the coupling states of the coupling device. For a coupling device in its first coupling state, the inner toothing of the coupling sleeve engages meshing into the first coupling gear wheel, for a coupling device in its second coupling state, meshing into the second coupling gear wheel. Since the coupling sleeve may be mechanically actively connected in its turn to the reset spring, when the closing force of the reset spring is exerted, the one predetermined direction of rotation of the coupling sleeve is produced. Depending on which coupling state of the coupling device is set, and through the one of the two coupling gear wheels into which the inner toothing of the coupling sleeve makes meshing engagement, a reversal of the directions of rotation of the coupling gear wheels is produced. Via the mechanically active connection of the first coupling gear wheel to the transmission section, and thus to the actuating element, a provision of the first or second closing direction of the closing is made possible through this. In summary this can be provided in the form of embodiment described by the mechanically especially simply embodied coupling sleeve and the choice of coupling gear wheel used for meshing engagement of the coupling sleeve.

In some embodiments, the first coupling gear wheel and the second coupling gear wheel are embodied identically. Identically embodied coupling gear wheels have the same number of teeth and the same radius. In this way it can be ensured that both the coupling gear wheels, even with different directions of rotation, turn at the same speed. A difference in the amount of closing force exerted by the reset spring can be avoided or at least minimised in this way.

In some embodiments, the transmission section comprises transmission gearing, in particular a reduction gear, with at least one transmission gear wheel, wherein the first coupling gear wheel is arranged coaxially and, in a torsion-proof manner, on the at least one transmission gear wheel. A transmission gear of this type, in particular a reduction gear, as part of the transmission section, especially enables the mechanically active connection between the drive element and the actuating element of the actuator to be provided in a simple manner. A transmission gear of this type has at least one transmission gear wheel. A first coupling gear wheel arranged coaxially and, in a torsion-proof manner, on this transmission gear wheel in its turn enables a mechanically active connection to be provided between the transmission section and the coupling device especially easily or to be provided at least partly. In this way the first coupling gear wheel and the second coupling gear wheel are mechanically actively connected at all times to the transmission section and turn each time as well that the actuating element is actuated by the drive element. Via a setting of the coupling sleeve, which depending on the coupling state of the coupling device, makes a meshed engagement into the first or the second coupling gear wheel, in its turn enables the mechanically active connection between the transmission section of the coupling device to be set or established. In this way for example introducing a pre-tensioning into the reset spring can be undertaken or at least supported.

In some embodiments, the reset spring may comprise a scroll spring, which is arranged on an outer side of the coupling sleeve. A scroll spring of this type can in particular have an especially soft spring hardness and a flat characteristic curve, whereby the entire actuator, in particular the drive element, can be operated without being greatly influenced by the reset spring. An arrangement on an outer side of the coupling sleeve, in particular attaching the reset spring to the outer side of the coupling sleeve, makes possible an especially space-saving embodiment of the coupling device and of the reset spring as a common mechanical section and thus a reduction in the space required for the actuator as a whole.

In some embodiments, the coupling device has a pusher element able to be brought into at least a first pusher position and a second pusher position for setting the coupling state of the coupling device, wherein the first pusher position corresponds to the first coupling state and the second pusher position to the second coupling state. A pusher element of this type, which may be actuated manually and/or by a drive, enables it to be made possible, in an especially simple manner, to set the coupling device into its coupling states. For this purpose, for example the pusher element can be moved into the first pusher position for setting the coupling device into its first coupling state, into the second pusher position for setting the coupling device into its second coupling state. As described above, this can be done manually, but also by an additional drive, for example an electric motor or also a pneumatically or hydraulically operated lifting cylinder.

In some embodiments, the pusher element and the coupling sleeve may be arranged in fixed location relative to one another, in particular to be fastened to one another. As described above, the coupling state of the coupling device is determined via the coupling sleeve, in particular the choice of coupling gear wheel, into which the inner toothing of the coupling sleeve engages. An arrangement of the pusher elements and the coupling sleeve in a fixed location relative to one another, in particular by them being fastened to one another, thus enables provision to be made especially easily that, during a movement of the pusher element into its first or second pusher position, the first or second coupling state of the coupling device is set automatically. The pusher element and the coupling sleeve can in particular be fastened directly to one another, as an alternative also indirectly with the involvement of further components, of an installation plate for example. This enables a particularly large number of possibilities and in particular possibilities of a realisation of the actuator able to be adapted specifically to the inventive actuator to be provided.

In some embodiments, the coupling has a signal element, in particular an electric switching element, for at least partly detecting the coupling state and/or the pusher position. In this way information can be provided internally in the drive about which coupling state or which pusher position, which in its turn corresponds to a coupling state, is currently set. This in its turn allows a decision about the position or direction in which the actuator is installed or is to be installed. In this way for example an appropriately suitable activation of the drive element can already be defined in advance.

In some embodiments, the coupling device is able to be put into a neutral state, in which the mechanically active connection between the transmission section and the reset spring is separated. A neutral state of this type in other words thus provides an actuator in which no resetting force or closing force is exerted or can be exerted on the actuating element by the reset spring. This is advantageous for example for in locations in which the actuator is deployed in which moving the actuating element into a specific position in the event of a power outage is not necessary or at least is not relevant to safety. There can also be provision for example, with an installation of the actuator, even with a coupling device in its neutral state, for the reset spring to be provided with a pre-tension. In some embodiments, there is a mechanically active connection between the transmission section and the reset spring not even obtaining in this neutral state, so that the reset spring can be pre-tensioned without any further effect on the transmission section and thus on the rest of the actuator.

In some embodiments, the actuator has a retaining device for maintaining a pre-tensioning of the reset spring for a coupling device in its neutral state. In other words, a retaining device of this type enables an existing pre-tensioning of the reset spring to be maintained even if the actuator, in particular the coupling device, is set in its neutral state. A relaxation of the reset spring by bringing the coupling device into its neutral state can be avoided in this way. With a later setting of the first coupling state or of the second coupling state, the reset spring continues to be available with a pre-tensioning and can therefore be used immediately in order to exert a closing force on the actuating element of the actuator. In some embodiments, with a coupling device in its first or its second coupling state, the retaining device cannot exert any influence or at least exert any significant influence on the reset spring.

In some embodiments, the coupling device has a pre-tensioning device for introducing a pre-tensioning into the reset spring. This is often of advantage since in this way the reset spring can be provided especially easily with a pre-tensioning. A pre-tensioning of this type thus makes it possible, even during the first setting of the coupling device into its first coupling state or its second coupling state, to be able to exert a closing force on the actuating element, provided via the mechanically active connection via the transmission section.

In some embodiments, there is a method for setting an actuator as described above characterised by the following steps:
  a) Bringing the actuating element into an actuating position, in particular into an actuating position with maximum deflection,
  b) Introducing a pre-tensioning into the reset spring, and
  c) Bringing the coupling device, according to the actuating position of the actuating element, into its first coupling state or into its second coupling state.

All advantages that have been described in detail in relation to an actuator in accordance with the teachings herein can thus also be provided by a method incorporating the teachings herein, which is embodied for setting an actuator of this type.

In a first step a) of an example method an actuator, in particular the actuating element of the actuator, is brought into an actuating position. The actuating position can be chosen such that it represents a maximum deflection. With an actuating element embodied as a flap or valve or an actuating element activating a flap or valve there can in particular be provision for this actuating position with maximum deflection to represent an end position with an end stop, for example a maximum opening or a complete closing of the flap or of the valve.

In the next step b) a pre-tensioning is introduced into the reset spring of the actuator. In other words, the reset spring is pre-tensioned, for example when a scroll spring is used, said spring is tensioned by twisting the scroll spring against its relaxation direction of rotation. The introduction of the pre-tensioning can especially preferably be undertaken by a pre-tensioning device. Further preferably, the pre-tensioning of the reset spring can subsequently be fixed by a retaining device.

In the last step c) of the method the coupling device, according to the actuating position of the actuating element, is brought into its first coupling state or into its second coupling state. In other words, in this step c) a mechanically active connection between the transmission section of the actuator and the reset spring of the actuator is established by a corresponding setting of the coupling device of the actuator. This establishment of the active connection may be undertaken in such a way that the coupling state of the coupling device corresponds to the actuating position of the actuating element, which was set in step a) of an inventive method. In other words, the coupling state can be selected in such a way that the closing force, acting through the reset spring via the mechanically active connection on the actuating element, has a closing direction that is embodied to the extent that the actuating element is moved from its actuating position set in step a). This is advantageous in particular when for example, during a power outage, the drive element of the actuator fails and thereby the actuating element, driven by the reset spring, is set back again into an initial position.

In some embodiments, for undertaking step b), and/or for undertaking steps a) and b), the coupling device is set in a neutral state. In a neutral state of this type in particular the mechanically active connection between the reset spring and the transmission section is released by setting the coupling device accordingly. Both the introduction of the pre-tensioning into the reset spring in step b) and also the bringing of the actuating element into an actuating position in step a) can thus be simplified, in particular by the fact that, with a coupling device in its neutral state, the reset spring and the transmission section do not have any influence on one another.

Figure 2:
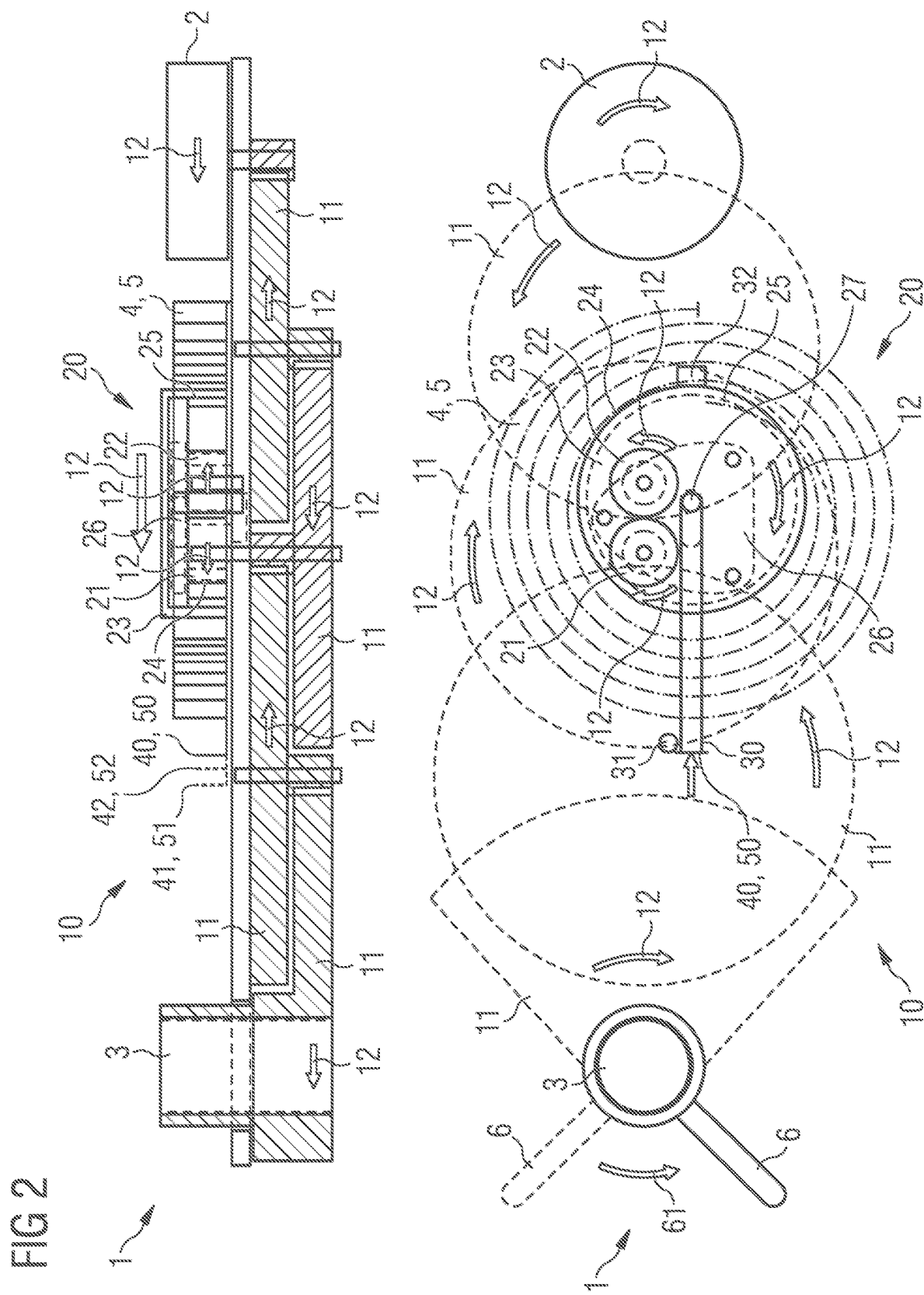
FIG. 2 shows an actuator incorporating teachings of the present disclosure with a coupling device in its first coupling state.
Figure 3:
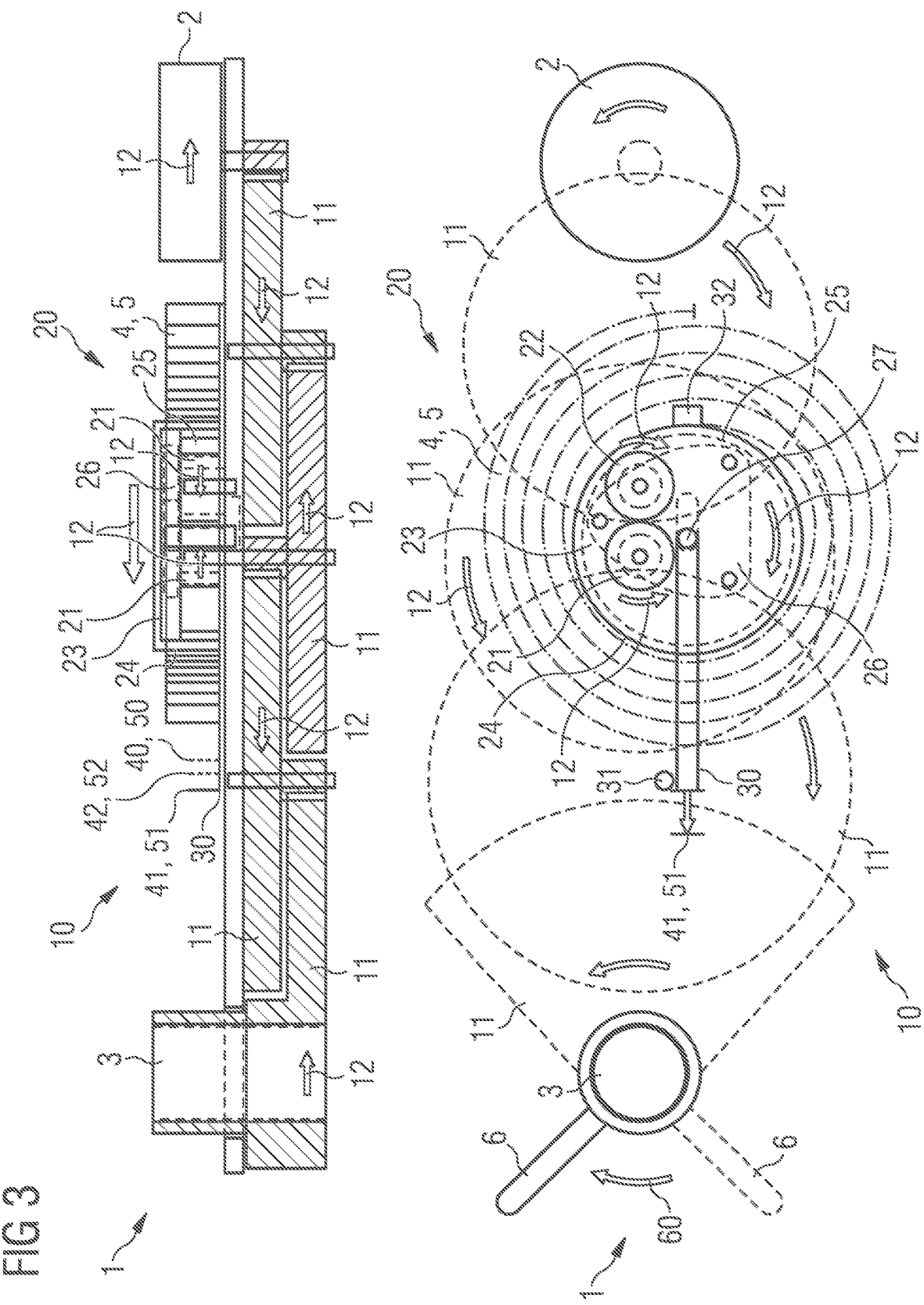
FIG. 3 shows an actuator incorporating teachings of the present disclosure with a coupling device in its second coupling state.

FIGS. 1 to 3 each show an example actuator 1, wherein in FIG. 1 the coupling device 20 of the actuator 1 is present in its neutral state 42, in FIG. 2 in its first coupling state 40 and in FIG. 3 in its second coupling state 41. FIGS. 1 to 3 will therefore be described together below, wherein the individual figures are each discussed separately. Further, in FIGS. 1 to 3, a sectional view from the side of the inventive actuator 1 is shown in the upper diagram, a schematic diagram viewed from above in the lower diagram.

The actuator 1 shown in FIGS. 1 to 3 in particular has a drive element 2, which has a mechanically active connection via a transmission section 10 to an actuating element 3. The drive element 2, as shown, can be an electric drive, however can also be embodied as a pneumatic or hydraulic cylinder element. The actuating element 3 in its turn can for example be provided for driving a flap 6 or a valve in systems for heating, ventilation, or cooling in a building or can even form a part of such a flap 6 or a valve. The transmission section 10, in the form of embodiment shown, is embodied as a reduction transmission with a number of transmission gear wheels 11. As well as the individual transmission gear wheels 11, in particular their directions of rotation 12 are also indicated. As well as the drive element 2, the transmission section 10 and also the actuating element 3 already described, the actuator 1 further has a reset spring 4, which in the form of embodiment shown, is embodied as a scroll spring 5.

For providing a mechanically active connection between just this reset spring 4 and the transmission section 10, a coupling device 20 is provided in the actuator 1. This coupling device 20 can be present in at least a first coupling state 40, shown in FIG. 2, and a second coupling state 41, depicted in FIG. 3. Moreover, in accordance with the embodiment shown, the coupling device 20 can also be present in the neutral state 42 shown in FIG. 1. In this neutral state 42 the mechanically active connection between the reset spring 4 and the transmission section 10 is in particular separated. For providing this mechanically active connection, as is shown in FIGS. 2 and 3, the coupling device 20 in particular has a first coupling gear wheel 21 and a second coupling gear wheel 22. The two coupling gear wheels 21, 22 can be embodied identically and have a meshed engagement with one another, whereby the directions of rotation 12 of the two coupling gear wheels 21, 22 are embodied as opposite directions.

Arranged around the two coupling gear wheels 21, 22 is a coupling sleeve 23, which in particular has an inner toothing 25. In FIG. 1, and thus in the neutral state 42 of the coupling device 20, the coupling sleeve 23 is arranged in such a way that no mechanically active connection is present between the inner toothing 25 of the coupling sleeve 23 and the two coupling gear wheels 21, 22. In other words, although the two coupling gear wheels 21, 22 rotate as well when the drive element 2 is actuated, since the first coupling gear wheel 21 is arranged coaxially fixed on one of the transmission gear wheels 11, the coupling sleeve 23 and the reset spring 4 arranged on the outer side 24 of the coupling sleeve 23 are however not driven as well. At the same time however, for example via a pre-tensioning device 27, the coupling sleeve 23 and thus the reset spring 4 can be turned, in order to introduce a pre-tensioning into the reset spring 4. Via a retaining device 32 this pre-tensioning can preferably also be maintained in the present neutral state 42.

In FIGS. 2 and 3, the first coupling state 40 or the second coupling state 41 of the coupling device 20 are now shown. The two coupling states 40, 41 differ in particular by which of the two coupling gear wheels 21, 22 is engaging into the inner toothing 25 of the coupling sleeve 23. Thus, in FIG. 2, the inner toothing 25 of the coupling sleeve 23 has a meshing engagement with the first coupling gear wheel 21, in FIG. 3 with the second coupling gear wheel 22. This can be reversed in particular via a pusher element 30, which has a fixed connection via a common installation plate 26 to the coupling sleeve 23 or can be fastened to the latter and can be moved between a first pusher position 50, which corresponds to the first coupling state 40, and a second pusher position 51, which corresponds to the second coupling state 41. A neutral pusher position 52, which in its turn corresponds to the neutral state 42 of the coupling device 20 shown in FIG. 1, lies between the first pusher position 50 and the second pusher position 51. A signal element 31, which can be embodied as an electric switch for example, in particular enables pusher positions 50, 51, 52 of the respective coupling state 40, 41 or the neutral state 42 of the coupling device 20 to be established. Downstream establishment of such a state can be used for example on the one hand to determine a state of the actuator 1 and also for example to automatically define a drive direction of the drive element 2.

In a comparison of FIG. 2 and FIG. 3, it is clear that almost all directions of rotation 12 are reversed. In other words, different installation positions or directions of an inventive actuator 1 are shown in FIG. 2 and FIG. 3. The only direction of rotation 12 that is not reversed is that which is depicted directly in the coupling sleeve 23 and which also accordingly represents the direction of rotation 12 of the coupling sleeve 23. The reason for this is that in particular, since the reset spring 4 is arranged on the outside 24 of the coupling sleeve 23, and determines the direction of rotation 12 of the coupling sleeve 23 independently of the installation position or direction of the actuator 1.

It can be ensured however via the setting of a corresponding coupling state 40, 41 of the coupling device 20 that, in each of the installation positions or directions of the actuator 1, a corresponding closing force with an appropriate closing direction 60, 61 can be exerted on the actuating element 3 and for example on a flap 6 arranged on the actuating element 3 by the reset spring 4. This is shown in FIG. 2 and FIG. 3 with the closing directions 60, 61, wherein in FIG. 2 the first closing direction 60 is opposite to the second closing direction 61 shown in FIG. 3. Shown by a solid line in each case for example is a possible arrangement of the flap 6, which in this case corresponds to a closed flap 6 in each case, with a dashed line showing is maximum deflected position in each case.

In summary, in particular an installation in different, in particular opposing positions or directions can be provided by an example actuator 1, wherein through a corresponding setting of a coupling device 20 of the actuator 1, a closing force of a reset spring 4 can be provided on the actuating element 3 of the actuator 1, which is adapted to the respective installation position or direction. In other words, a first coupling state 4 can be set in particular by the coupling device 20, in which the closing force acts in a first closing direction 60 and a second coupling state 41 can be set, in which the closing force acts in a second closing direction 61. Preferably the first closing direction 60 and the second closing direction 61 are in particular opposite directions.

Figure 4:
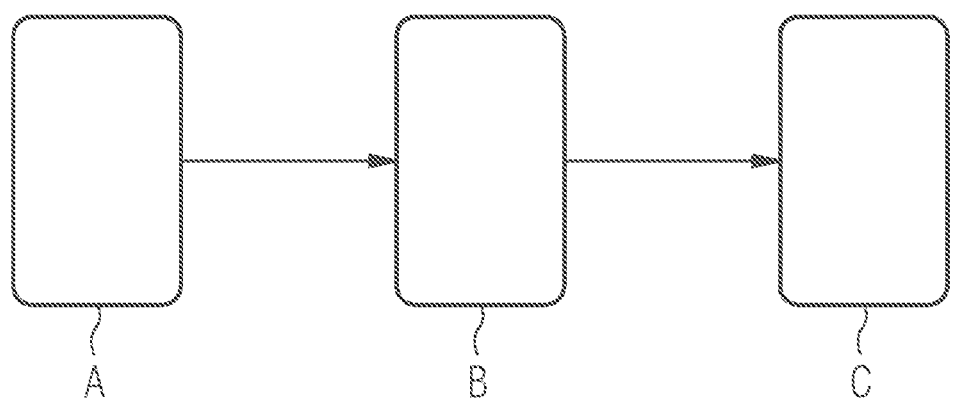
FIG. 4 shows a method incorporating teachings of the present disclosure.

FIG. 4 shows a schematic of an example method, as can be carried out by an actuator 1 for setting the same. The actuator 1 and its components needed for carrying out the method are not shown as well in the figure. The individual steps a), b) and c) are each labelled in FIG. 4 with upper-case characters A, B, C.

In a first step a) of the example method, the actuating element 3 of the actuator 1 in is brought into an actuating position. This actuating position can in particular represent an actuating position with maximum deflection. In this way for example a flap 6 arranged on the actuating element 3 can be opened to its maximum.

In the next step b) a pre-tensioning can be introduced into a reset spring 4 of the actuator 1. This can be done via a pre-tensioning device 27, wherein in particular, after introduction of the pre-tensioning, this pre-tensioning can be fixed and maintained in the reset spring 4 by a retaining device 32. In some embodiments, the two steps a) and b) can be carried out at a point in time at which a coupling device 20 of the actuator 1 is in a neutral state 42. The reason for this is in particular that, with a neutral state 42 of this type, no mechanically active connection between the transmission section 10 and the reset spring 4 is set via the coupling device 20, whereby both the bringing of the actuating element 3 into an actuating position and also the introduction of a pre-tensioning via the reset spring 4 can be carried out without any mutual influencing.

In the last step c) of the example method, a coupling device 20 of the actuator 1 is now brought into its coupling states 40, 41, in order to establish the mechanically active connection between the reset spring 4 and the transmission section 10 and thus also the actuating element 3. The choice of coupling states 40, 41 used corresponds in particular to the position of the actuating element 3 set in step a). In other words, after the example method has been carried out, an actuator 1 is present that can be installed in any given installation position or direction, wherein at the same time a pre-tensioned reset spring 4 for providing a resetting force with a corresponding closing direction 60, 61 can be provided.

LIST OF REFERENCE CHARACTERS

1 Actuator
2 Drive element
3 Actuating element
4 Reset spring
5 Coil spring
6 Flap
10 Transmission section
11 Transmission gear wheel
12 Direction of rotation
20 Coupling device
21 First coupling gear wheel
22 Second coupling gear wheel
23 Coupling sleeve
24 Outer side
25 Inner toothing
26 Installation plate
27 Pre-tensioning device
30 Pusher element
31 Signal element
32 Retaining device
40 First coupling state
41 Second coupling state
42 Neutral state
50 First pusher position
51 Second pusher position
52 Neutral pusher position
60 First closing direction
61 Second closing direction

The invention claimed is:
1. An actuator comprising:
a drive element;
a transmission section;
an actuating element;
wherein the drive element is mechanically actively connected to the actuating element through the transmission section;
a reset spring exerting a closing force acting on the actuating element; and a coupling device providing a mechanically active connection between the reset spring and the transmission section;
wherein the coupling device is configured to be brought into a first coupling state and a second coupling state;
with the coupling device in the first coupling state, the reset spring exerts the closing force on the actuating element in a first closing direction; and
with the coupling device in the second coupling state, the reset spring exerts the closing force on the actuating element in a second closing direction; and
the first closing direction and the second closing direction are different.

2. An actuator according to claim 1, wherein the first closing direction and the second closing direction are opposite directions or at least essentially opposite directions.

3. An actuator according to claim 1, wherein the coupling device comprises a first coupling gear wheel, a second coupling gear wheel, and a coupling sleeve with an inner toothing;
wherein the coupling gear wheels have opposite directions of rotation;
wherein the first coupling gear wheel is mechanically actively connected to the transmission section;
wherein, with the coupling device in the first coupling state, the inner toothing of the coupling sleeve makes a meshing engagement into the first coupling gear wheel; and
with the coupling device in the second coupling state, the inner toothing of the coupling sleeve makes a meshing engagement into the second coupling gear wheel.

4. An actuator according to claim 3, wherein the first coupling gear wheel and the second coupling gear wheel have identical tooth counts and radii.

5. An actuator according to claim 3, wherein:
the transmission section comprises a transmission gear with a transmission gear wheel; and
the first coupling gear wheel is coaxial to the transmission gear wheel and arranged in a torsion-proof manner on the transmission gear wheel.

6. An actuator according to claim 3, wherein the reset spring comprises a scroll spring arranged on an outer side of the coupling sleeve.

7. An actuator according to claim 1, wherein:
the coupling device includes a pusher element with a first pusher position and a second pusher position for setting a coupling state; and
the first pusher position corresponds to the first coupling state and the second pusher position to the second coupling state.

8. An actuator according to claim 7, wherein the pusher element and the coupling sleeve fixed in relation to one another.

9. An actuator according to claim 1, wherein the coupling device includes a signal element generating a signal corresponding to at least one of the coupling state or the pusher position.

10. An actuator according to claim 1, wherein the coupling device has a neutral state wherein the mechanically active connection between the transmission section and the reset spring is separated.

11. An actuator according to claim 10, further comprising a retaining device for maintaining a pre-tensioning of the reset spring in the neutral state.

12. An actuator according to claim 1, wherein the coupling device includes a pre-tensioning device for applying a tension to the reset spring.

13. A method for setting an actuator comprising a drive element, a transmission section, an actuating element actively connected to the drive element through the transmission section, a reset spring exerting a closing force acting on the actuating element, and a coupling device providing a mechanically active connection between the reset spring and the transmission section, wherein the coupling device in a first coupling state causes the reset spring to exert a closing force on the actuating element in a first closing direction and with the coupling device in the second coupling state, causes the reset spring to exert the closing force on the actuating element in a second closing direction, the method comprising:
bringing the actuating element into an actuating position;
introducing a pre-tension into the reset spring; and
bringing the coupling device into the first coupling state or the second coupling state.

14. Method according to claim 13, further comprising setting the coupling device to a neutral state before bring the actuating element into an actuating position.

* * * * *